Nov. 6, 1945.　　　C. SHENDRICK　　　2,388,369
FLUID CONTROL VALVE
Filed Oct. 30, 1944　　　3 Sheets-Sheet 2

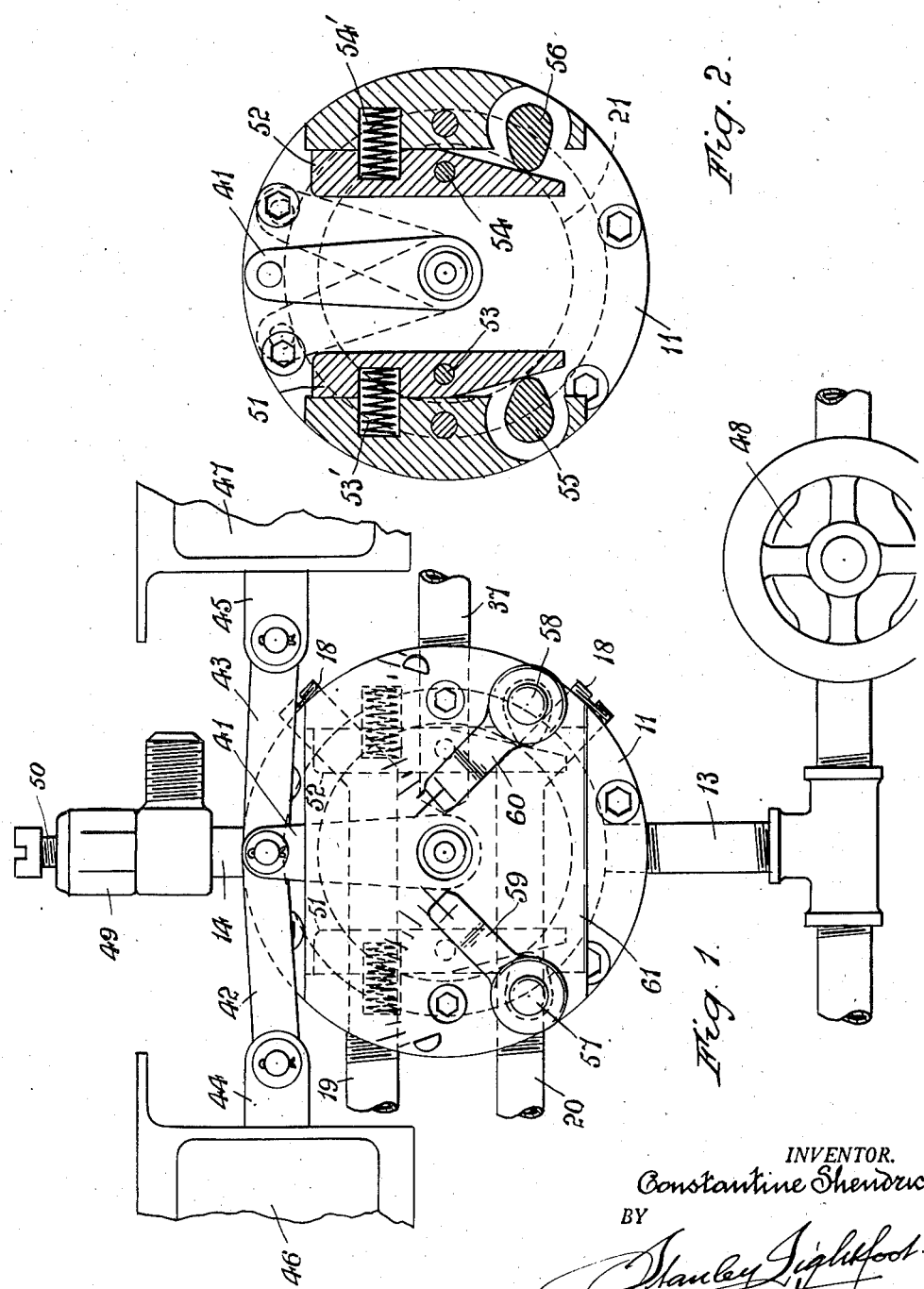

INVENTOR.
Constantine Shendrick.
BY
Stanley Lightfoot
ATTORNEY.

Nov. 6, 1945.  C. SHENDRICK  2,388,369
FLUID CONTROL VALVE
Filed Oct. 30, 1944  3 Sheets-Sheet 3

INVENTOR.
Constantine Shendrick.
BY
Stanley Lightfoot.

Patented Nov. 6, 1945

2,388,369

UNITED STATES PATENT OFFICE 2,388,369

FLUID CONTROL VALVE

Constantine Shendrick, Detroit, Mich.

Application October 30, 1944, Serial No. 561,043

2 Claims. (Cl. 121—45)

This application is a continuation in part of my abandoned application filed Nov. 12, 1943, Serial No. 510,047; and relates to fluid controlling valves and more particularly to means for controlling the flow of hydraulic fluid to and from the operating cylinders of machines, such, for example, as grinding machines, wherein the speed of operation in one or other direction is required to be regulated, and especially where the speed of an operational stroke is to be reduced toward the end or during a portion thereof.

In a grinding machine, for instance, the abrasive wheel may be required to be fed up to the work at a relatively high rate of speed and thereafter into the work at a relatively slow rate of speed regulated in accordance with the nature of the work. In retracting the wheel from the work it is desirable that this movement be accomplished at relatively high speed in order to save time in bringing the grinding wheel back to a pre-working position. However, if this retraction is effected by the operation of the piston of a fluid or hydraulic cylinder, it is desirable that the end of the stroke of the piston be reduced in speed to minimize shock to the parts and prevent undue forces being exerted on the end of the cylinder by the travelling piston.

This desirability of cushioning the stroke at the end of piston movement in a cylinder applies to any type of hydraulic or fluid-operating machine, and the present invention proposes to provide a control valve arrangement of simple design and operative association with the fluid or hydraulic cylinder of the machine to accomplish the regulating and braking effects referred to, either for eventual control of the action of a part of a machine or for the simple control of the action of the piston of the cylinder, such as a safety feature, or for both purposes, the said valve being adapted to easy and positive regulation as to the speed of fluid flow therethrough in different directions, and throughout determined periods required, so that a highly efficient control of the feed or other operations of the machine may be secured.

A further object is to provide such a device which may be readily operated and regulated, even at high fluid pressures, with freedom from binding under such pressures whilst being at the same time equally adapted to operation where relatively low pressures are to be used; and also to provide a construction which admits of being built to close limits, when so desired, without resulting in objectionable friction between the parts, such as would detract from its sensitive operation.

Still further, the said invention contemplates the provision, in a rotary fluid control valve, of adjustable means to variably determine the limits of rotary opening or closing, or of opening and closing, of the valve so that the extent of such limit may be varied to determine a maximum free flow in one or other direction through the valve followed by a controlled restricted flow, and thereby determine the variable speed of operation of the machine or device controlled thereby in one or other of its directions of operation.

Still further objects or advantages subsidiary to aforesaid objects, or resulting from the construction or operation of the invention as it may be carried into effect, will become apparent as the said invention is hereinafter further disclosed.

In carrying the said invention into effect, I may provide a rotary valve casing housing a disc valve in a chamber providing an annular space therearound, the said valve being ported according to requirements from one of its faces to the periphery thereof to provide communication, according to its rotary setting, with inlet and exhaust ports formed in said casing and communicating with the ported face of said disc valve, a fluid pressure line communicating with said annular chamber, a fluid relief line from said annular chamber, a swingable operating arm connected with said disc valve and actuated by suitably disposed solenoids, through which circuits may be closed by stops or switches on the machine with which the valve is utilized, and manually adjustable stops for variably determining the extent of swing of the said lever in one or other of its directions, said stops being yieldable to permit full opening of the valve during a timed interval. Suitable regulating means may be provided for variably determining the flow and pressure of fluid admitted to the said annular chamber. All of which is more particularly described and ascertained hereinafter, by way of example, having reference to the accompanying drawings, wherein:

Figure 1 is an elevation of the improved control valve and its immediate connections;

Figure 2 is a detail section of the same taken on a plane indicated by the line 2—2.

Figure 3 is a cross-section of the same, taken on a plane indicated by the line 3—3 in Figure 4;

Similar characters of reference indicate similar parts in the several figures of the drawings.

Figure 4:
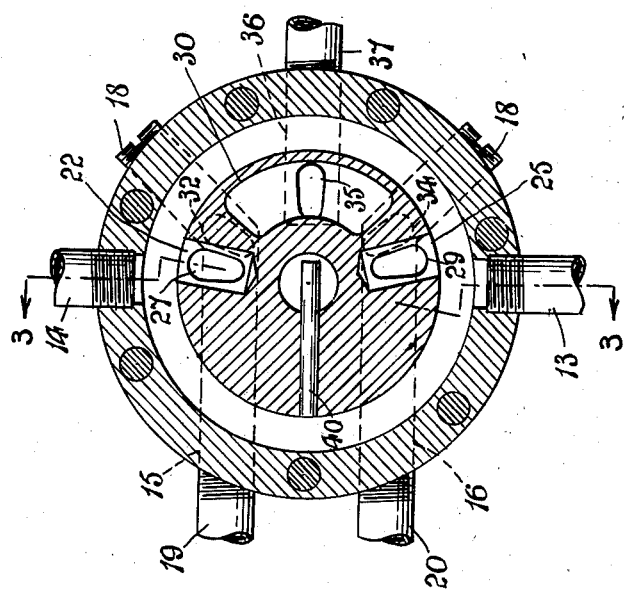
Figure 4 is a section of the same, taken on a plane indicated by the line 4—4 in Figure 3.
Figure 3:
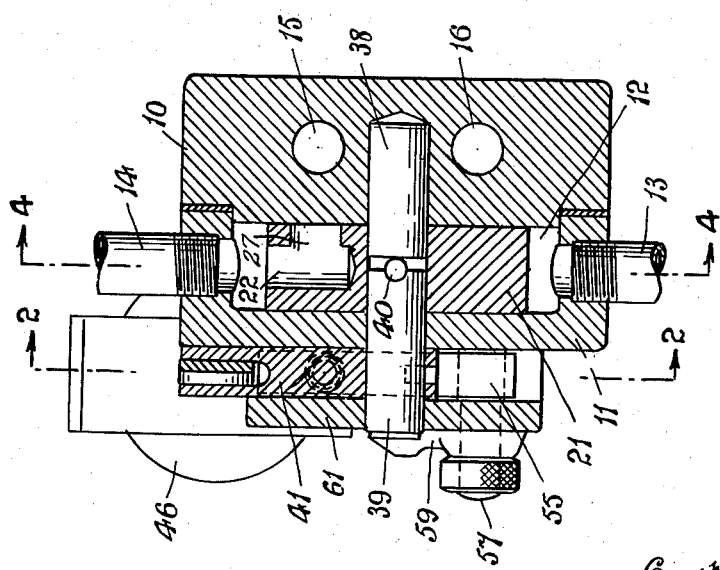
Figure 3.

The valve casing proper is shown as comprising back plate 10, and a cover or front plate 11, the latter being hollow to provide the valve chamber 12, with which ducts 13 and 14 are connected. The back plate 10 is shown as being provided with passages 15 and 16, passing entirely therethrough, with each of them closed at one end, as by plugs 18, the other ends of said passages having ducts 19 and 20 connected therewith.

For the purposes of future description, it may be assumed that the duct 19 is connected with that end of the hydraulic cylinder to which a fluid is to be admitted so that its piston may move a machine part in a forward direction; and the duct 20 connected to the other end of such cylinder, whereby hydraulic fluid admitted to the cylinder thereby would move the work operating piston in the reverse direction; all of which will be readily understood without further description or illustration and does not in itself form an essential part of the present invention.

It will be understood, in such cases, that when fluid flows through the duct 19 to the work cylinder, exhaust fluid flows back through the duct 20 toward the valve and vice versa. The purpose of carrying the passages 15 and 16 entirely through the back plate 10 in the manner illustrated, is simply so that further ducts may be added, if desired, to connect an additional work cylinder thereto by simply removing the plugs 18, or to permit the connecting of the ducts at the positions where the plugs are located, where this would be more convenient than the connection shown.

Within the chamber 12 is a rotary disc valve 21 of a width which is that of the said chamber and of a diameter which is less than that of the said chamber so that, when in position, an annular chamber is left around the said valve disc, and this valve disc has radial ports 22 and 25 communicating with ports 27 and 29, respectively, opening through the back of the said valve disc to the face of the back plate 10. The back of the said valve disc is also provided with an arcuate port 30 which does not communicate with the annular chamber about the said disc.

32 is a port from the passage 15 to that portion of the face of the back plate 10 which is covered by the said disc valve, this port being positioned to match with the port and 27 of the valve disc, when the said valve disc is rotated (in the case of the example shown, in a clockwise direction) to one of its limits of rotation; and 34 is a similar port from the passage 16 with which the port 29 of the said valve may register when the said valve is rotated in the opposite direction to its other limit.

35 is a further port in the back plate 10, communicating with a passage 36 to which a duct 37 is connected and which may lead to the original source of supply of hydraulic fluid. This is the fluid exhaust duct and it will be seen that the arcuate port 30 of the disc valve is so proportioned and situated that when the valve is rotated in the clockwise direction to match the port 27 with port 32, the said arcuate port 30 will connect the ports 34 and 35. Similarly, when the valve disc is rotated to its anti-clockwise limit, matching the port 29 with the port 34, the said arcuate port 30 of the valve disc will connect the ports 32 and 35 of the back plate, From the foregoing it will be readily seen that, assuming the ducts 19 and 20 are connected to opposite ends of a work operating cylinder as hereinbefore related and fluid under pressure is admitted through the duct 13 to the annular chamber about the disc valve, the rotation of this valve in the clockwise direction to match the port 27 of the valve with the port 32 of the back plate will permit flow thereto of hydraulic fluid to the duct 19 and thence to the operating cylinder. At the same time the connecting of the ports 34 and 35 of the back plate by means of the arcuate port 30 of the valve will permit the exhaust flow of fluid from the exhausting end of the working cylinder through the duct 20 and the said ports to the exhaust duct 37 and thence back to the source of supply as may be required. The anti-clockwise rotation of the said valve to its other limit will reverse these conditions, the port 34 thereupon being opened to permit the flow through the duct 20 to that end of the cylinder to which it may be attached, and the port 32 then opening by the arcuate port 30 to the duct 35 to permit exhaust flow of fluid from the duct 19 to the exhaust duct 37.

As a simple and effective method of mounting the disc valve, I have shown the back plate as being provided with an axially located stud 38 extended partially through the said disc and a pin 39 rotatably mounted in the cover plate 11, also extending in the opposite direction partially through the said valve disc and recessed in its inner end to engage a drive pin 40 carried by the said valve disc, whereby, when the parts are so assembled, rotation of the said pin 39 will effect rotation of the said valve disc on the stud 38. The outer end of the said pin 39 has mounted thereon a swinging operating lever 41, the free end of which is being shown connected by links 42 and 43 to armatures 44 and 45 of solenoids 46 and 47. These solenoids may be connected in any well-known manner (not shown) to the limit stops or their equivalent of a machine with which the device is intended to be used.

48 indicates a pressure valve by which the admission pressure of fluid to the valve chamber 12 may be set or regulated, and 49 indicates an adjustable relief valve having the usual adjusting screw 50 by means of which the maximum pressure of fluid in the valve chamber may be determined. Both of these valves may be of any well known construction and do not call for detailed description here.

It is desirable that control of the speed of flow of hydraulic fluid through the valve to and from the operating cylinder, or device with which the valve is to be connected, may be determined and varied from time to time to suit the type of work which is being done, or to cushion the piston toward the end of its stroke in the cylinder. Both of these results may be accomplished by controlling the exhaust from either end of the said cylinder or device as obviously the operating fluid cannot operate the cylinder or device faster than the fluid is relieved or exhausted therefrom. Therefore, I have provided means whereby I may control the flow of fluid passing through the device, whether it be through the duct 19 or the duct 20, in the example. A simple method of effecting this control is by means of stops 51 and 52 so pivoted, as at 53 and 54 that their upper ends may be swung into the path of the operating lever 41 of the valve as by compression springs 53' and 54'.

The lower ends of the said pivoted stops 51 and 52 are shown as impinging on cams 55 and 56 carried by pins 57 and 58, respectively, which in turn are provided with operating fingers 59 and 60 which may also serve as pointers to indicate their positions of rotary adjustment by their relation to suitable graduations, provided on the face of a housing 61 enclosing the said pivoted stops and carrying the said springs and stop-engaging cams.

With the cams in the positions shown on the drawings, the upper ends of the pivoted stops are retracted to points where they permit the full swing of the lever 41 required for the full opening of the port 32 in the manner already described, when the said lever is moved to the right as shown on the drawings, and the full opening of the port 34 when the said lever is moved to the left.

However, it will be readily apparent that if one or other of the cams 55 or 56 is rotated from the position shown to permit the stop-operating spring 53' or 54', as the case may be, to push the upper end of the pivoted stop in the direction of the latter 41, such upper end would then enter the path of the movement of the said lever and thereby tend to restrict it to the extent of its encroachment on the path of movement which is determined by the extent of which the cam is rotated.

Figure 5:
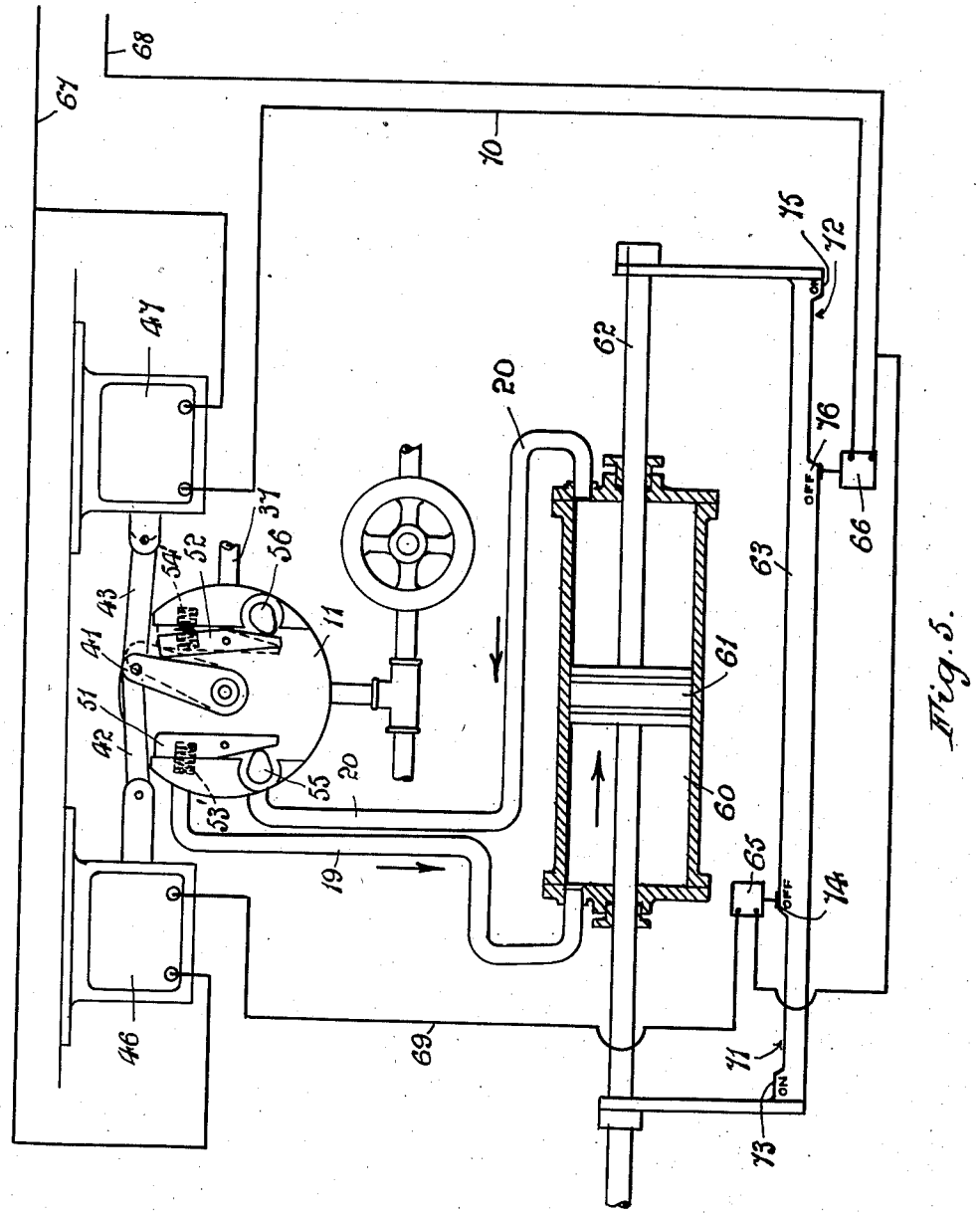
Figure 5 is a schematic drawing showing the electrical and hydraulic connections of the valve and a cylinder which it controls.

However, the spring 54' is capable of compression by the movement of the lever 41 to what may be considered the full open position, indicated in dotted lines in Figure 5 of the drawings, whereby the stop 52 is moved against the action of the said spring 54' to the normal full open position, also indicated in dotted lines in the said Figure 5, and the valve operating lever 41 will remain in such position as long as it is under the influence of the energized solenoid 47. When the said solenoid 47 is de-energized, however, and it no longer influences the lever 41, the spring 54', being free to then push the stop 52 and the lever 41 to the position indicated in full lines in the said Figure 5, will result in the valve being then moved back to a partly open position determined by the setting of the cam 56, as will be well understood. The spring 53' of the stop 51 may similarly function with respect to the said valve operating lever 41 when the said lever is operated in the other direction by the energizing and eventual de-energization of the solenoid 46.

The wiring diagram of the said Figure 5 illustrates schematically a simple arrangement for effecting the timed energizing and de-energizing of the said solenoids, the electrical lead 67 being connected to one end of the coil of each of the said solenoids and the other lead 68 connected to one of the terminals of switches 65 and 66. These switches may be of the well known type wherein they are opened and closed by successive operations of a single push button. The other terminal of the switch 65 is connected by the wire 69 to the coil of the solenoid 46, and the wire 70 is connected to the other terminal of the switch 66 and to the coil of the solenoid 47; whereby the closing of either of the said switches will energize one or other of the said solenoids.

60 indicates the hydraulic cylinder of the machine, the operation of which machine the valve is intended to control, and 61 is the reciprocal piston of the said cylinder, the piston rod 62 of which is shown as carrying a switch control bar 63 having elongated recesses 71 and 72 therein of such disposition and length as to effect such timing as may be desired of the operation of the said switches by the said bar 63. In the present example it is assumed that it is required that the piston travel at relatively high speed through the first half of its stroke, in either direction, and at a reduced speed throughout the remaining half of the stroke, which reduced speed is that determined by the restriction of the valve openings by the setting of the cam 55 or 56 in the manner already described.

The recesses 71 and 72 of the switch operating bar 63 are so positioned and of such length that the button of the switch 65 will dwell in the bottom of the recess 71 during the latter half of the movement of the piston in the direction indicated by the arrow, and this button having been previously operated by the raised portion 74 of the bar to open the switch, the solenoid 46 will remain de-energized during the entire stroke in this direction until eventually the button of the said switch 65 is again operated to close the said switch 65 by the abutment 73.

However, during the first part of this stroke of the piston the button of the other switch 66 will dwell in the bottom of the recess 72 of the switch operating bar, said switch having been previously closed by the operation of the abutment 75 at the beginning of the stroke to energize the solenoid 47, thereby effecting the movement of the valve operating lever 41 to the full open position indicated in dotted lines in the said Figure 5. Thus, as the dwell of the recess 72 passes over the button of the switch 66 during the first half of the stroke of the piston, the said solenoid 47 remains energized and the valve fully open until the abutment 76 of the switch operating bar again operates the button of the switch 66 to break the circuit through the solenoid 47. The spring 54' is then free to move the said stop and consequently the valve operating lever 41 to the position shown in full lines in the said Figure 5, whereby flow through the valve is partially restricted as hereinbefore explained. Consequently the second half of the stroke of the piston will be at an accordingly reduced speed.

Upon the return stroke of the piston the same cycle of operations takes place with respect to the solenoid 46, and the extent of restriction of flow to the cylinder during the latter portion of this return stroke will be determined by the setting of the cam 55.

An arrangement such as that described has both safety and operational control features capable of adaptation to fine timing of variable speeds of operation and lends itself admirably to the control of hydraulically driven mechanisms with a minimum of complication but a high degree of efficiency.

This invention may be developed within the scope of the following claims without departing from the essential features of the said invention, and it is desired that the specification and drawings be read as being merely illustrative of a practical embodiment of the said invention and not in a strictly limiting sense.

What I claim is:

1. In combination with a fluid operated mechanism, a valve movable in opposite directions to control fluid flow for the operation of such mechanism in opposite directions, means for moving said valve, means for the controlled operation of said moving means, adjustable limit resiliently yieldable means for variably limiting the movement of said valve in either of said directions to vary the speed of operation of said mechanism in its corresponding direction, and means responsive to predetermined movements of said mechanism for actuating said controlling means to cause the moving means to move the valve against the resistance of said yieldable means for effecting the movements of said valve to fully open positions for pre-determined periods.

2. In combination with a fluid operated mechanism, the rotary valve rotatable in opposite directions to control fluid flow for the operations of such mechanism in opposite directions, means for moving said valve, means for controlling operation of said moving means, resiliently yieldable adjustable limit means for variably limiting the angle of rotary movement of said valve in either of said directions to vary the speed of operation of said mechanism in its corresponding direction, and means responsive to predetermined movements of said mechanism for actuating said controlling means to cause the moving means to move the valve against the resistance of said yieldable means for effecting the movements of said valve to fully open positions for predetermined periods.

CONSTANTINE SHENDRICK.